US007493321B2

(12) United States Patent
Bartek et al.

(10) Patent No.: US 7,493,321 B2
(45) Date of Patent: Feb. 17, 2009

(54) METHOD, SYSTEM, AND COMPUTER PROGRAM PRODUCT FOR CREATING NAVIGATION VIEWS BASED ON HISTORICAL USER BEHAVIOR

(75) Inventors: Velda A. Bartek, Apex, NC (US); Eric L. Masselle, Raleigh, NC (US); Patrick G. McGowan, Chapel Hill, NC (US)

(73) Assignee: International Business Machines Corporation, Armonk, NY (US)

(*) Notice: Subject to any disclaimer, the term of this patent is extended or adjusted under 35 U.S.C. 154(b) by 389 days.

(21) Appl. No.: 11/064,158

(22) Filed: Feb. 23, 2005

(65) Prior Publication Data

US 2006/0190448 A1    Aug. 24, 2006

(51) Int. Cl.
*G06F 17/30* (2006.01)
(52) U.S. Cl. .............................. 707/5; 707/101; 715/234
(58) Field of Classification Search .................. 707/5, 707/6, 8, 9, 10, 512, 230, 3, 101, 102; 705/8; 715/234
See application file for complete search history.

(56) References Cited

U.S. PATENT DOCUMENTS

| | | | | |
|---|---|---|---|---|
| 4,821,211 A | * | 4/1989 | Torres | 715/853 |
| 5,388,255 A | | 2/1995 | Pytlik et al. | |
| 5,485,174 A | * | 1/1996 | Henshaw et al. | 345/684 |
| 5,664,132 A | * | 9/1997 | Smith | 715/834 |
| 5,825,349 A | * | 10/1998 | Meier et al. | 345/684 |
| 5,825,675 A | * | 10/1998 | Want et al. | 708/142 |
| 5,870,559 A | | 2/1999 | Leshem et al. | |
| 5,913,037 A | * | 6/1999 | Spofford et al. | 709/226 |
| 5,943,679 A | * | 8/1999 | Niles et al. | 715/247 |
| 6,038,610 A | | 3/2000 | Belfiore et al. | |
| 6,314,424 B1 | | 11/2001 | Kaczmarski et al. | |
| 6,384,845 B1 | * | 5/2002 | Takaike | 715/786 |
| 6,393,427 B1 | * | 5/2002 | Vu et al. | 707/101 |
| 6,418,429 B1 | * | 7/2002 | Borovoy et al. | 707/3 |
| 6,526,424 B2 | * | 2/2003 | Kanno et al. | 715/512 |
| 6,535,912 B1 | * | 3/2003 | Anupam et al. | 715/501.1 |
| 6,633,912 B1 | | 10/2003 | Welter et al. | |
| 6,701,350 B1 | | 3/2004 | Mitchell | |
| 6,745,179 B2 | * | 6/2004 | Laronge et al. | 707/3 |
| 6,839,721 B2 | * | 1/2005 | Schwols | 707/200 |
| 2003/0103090 A1 | | 6/2003 | Kelley et al. | |

* cited by examiner

*Primary Examiner*—Shahid A Alam
(74) *Attorney, Agent, or Firm*—Andre Gibbs; Hoffman Warnick LLC

(57) ABSTRACT

The present invention provides a method, system, and computer program product for creating navigation views based on historical user behavior. The method comprises: tracking pages navigated by a user through a site to provide tracking data; generating a complete site view displaying all pages in the site; generating a reduced site view based on the tracking data and at least one filtering parameter, wherein the reduced site view displays a set of the pages navigated by the user, filtered by the at least one filtering parameter; and creating a custom navigation view based on the reduced site view.

17 Claims, 21 Drawing Sheets

DAY 1

Corporate Portal

32

→ Site Map  *38*

Home

Corporate Info
  News
  Daily Report
  Competitors
Business Unit Info
  News
  Local
  Regional
  National
  International
HR Tools
  You and YourCo
  Benefits
  Healthcare
  Reimbursement
  Other
Company Tools
  Employment
  Performance Track
  Development Plan
>Expenses  ← *34*
  Travel Expenses
  Other Expenses

Expenses:
Use this section of the site to report travel and other business expenses.
For help, call the travel support line at 1-800-888-9999.
Or, email travelsupport@we_llhelpyou.org

*30*

DAY 1

FIG. 5

DAY 2

DAY 3

METHOD, SYSTEM, AND COMPUTER PROGRAM PRODUCT FOR CREATING NAVIGATION VIEWS BASED ON HISTORICAL USER BEHAVIOR

BACKGROUND OF THE INVENTION

1. Field of the Invention

The present invention generally relates to portals and websites. More particularly, the present invention provides a method, system, and computer program product for creating navigation views based on historical user behavior.

2. Related Art

When navigating through a portal or website, using a site map that provides an overview of the structure and organization of the portal or website, a user may navigate to the same or a similar subset of pages each time he/she desires to obtain particular information and/or perform a particular task. Depending on the size and complexity of the portal or website and its corresponding site map, such navigation may be slow and cumbersome. It would be useful, therefore, to provide customizable site maps and corresponding custom portals and websites to a user that are tailored based on historical user behavior (e.g., navigation history). Such customizable site maps, portals, and websites would enable a user to quickly and easily access only those pages that are deemed to contain relevant information and/or are required to perform a particular task. Unfortunately, known portal and website navigation methodologies do not provide a mechanism for allowing users to tailor site maps and provide custom portals and websites according to historical user behavior.

SUMMARY OF THE INVENTION

In general, the present invention provides a method, system, and computer program product for creating navigation views based on historical user behavior. In particular, in accordance with the present invention, a user's navigation through a portal or website is tracked. The complete site map for the portal or website is displayed on a first (e.g., left) side of an interface, while a "reduced" site map, showing only navigated pages of the portal or website, is displayed on a second (e.g., right) side of the interface. As the time period for display is changed, both the complete site map and the reduced site map are modified to reflect the change. Some affordance for selecting the time period is provided. The ability to select a time period has at least two aspects: a user can choose a multi-day period, or a single day. For instance, a user can choose to see navigated pages of a portal or website for: the last week, the last month except for the last week, one day occurring one week ago today, etc. One aspect provides a picture of navigation activity over an extended period, while the other provides a snapshot for a day-long period of time. Other time periods (e.g., the previous 8 hours, the previous 12 hours, etc.) can also be selected.

A user can also can select minimum frequency as a parameter for the display of navigated pages in the reduced site map. For instance, a user can select to see in the reduced site map all navigated pages of the portal or website for the last month, where the page was visited at least twice. Frequency counts can be reset to allow for the tracking of more recent usage. The amount of time spent at a given page can also be specified as a parameter for the display of navigated pages in the reduced site map.

The reduced site map of a portal or website provided in accordance with the present invention can be saved and reused, and can be used to provide custom portals or websites. Further, each node (i.e., navigated page) displayed in the reduced site map can be selectively turned off: selecting "turns off" a node and all its descendents in the navigation. The deselected nodes are not included in the reduced site map when it is subsequently saved. Further, each navigated page displayed in the reduced site map can include information regarding the time and date of last visit.

A first aspect of the present invention is directed to a method for creating navigation views, comprising: tracking pages navigated by a user through a site to provide tracking data; generating a complete site view displaying all pages in the site; generating a reduced site view based on the tracking data and at least one filtering parameter, wherein the reduced site view displays a set of the pages navigated by the user, filtered by the at least one filtering parameter; and creating a custom navigation view based on the reduced site view.

A second aspect of the present invention is directed to a method for creating navigation views, comprising: tracking pages navigated by a user through a site to provide tracking data; generating a complete site view displaying all pages in the site; and generating a reduced site view adjacent the complete site view based on the tracking data and at least one filtering parameter, wherein the reduced site view displays a set of the pages navigated by the user, filtered by the at least one filtering parameter.

A third aspect of the present invention is directed to a system for creating navigation views, comprising: a system for tracking pages navigated by a user through a site to provide tracking data; a system for generating a complete site view displaying all pages in the site; a system for generating a reduced site view based on the tracking data and at least one filtering parameter, wherein the reduced site view displays a set of the pages navigated by the user, filtered by the at least one filtering parameter; and a system for creating a custom navigation view based on the reduced site view.

A fourth aspect of the present invention is directed to a program product stored on a computer readable medium for creating navigation views, the computer readable medium comprising program code for performing the following steps: tracking pages navigated by a user through a site to provide tracking data; generating a complete site view displaying all pages in the site; generating a reduced site view based on the tracking data and at least one filtering parameter, wherein the reduced site view displays a set of the pages navigated by the user, filtered by the at least one filtering parameter; and creating a custom navigation view based on the reduced site view.

A fifth aspect of the present invention is directed to a method for deploying an application for creating navigation views, comprising: providing a computer infrastructure being operable to: track pages navigated by a user through a site to provide tracking data; generate a complete site view displaying all pages in the site; generate a reduced site view based on the tracking data and at least one filtering parameter, wherein the reduced site view displays a set of the pages navigated by the user, filtered by the at least one filtering parameter; and create a custom navigation view based on the reduced site view.

A sixth aspect of the present invention is directed to computer software embodied in a propagated signal for creating navigation views, the computer software comprising instructions to cause a computer system to perform the following functions: track pages navigated by a user through a site to provide tracking data; generate a complete site view displaying all pages in the site; generate a reduced site view based on the tracking data and at least one filtering parameter, wherein the reduced site view displays a set of the pages navigated by the user, filtered by the at least one filtering parameter; and create a custom navigation view based on the reduced site view.

BRIEF DESCRIPTION OF THE DRAWINGS

These and other features of this invention will be more readily understood from the following detailed description of the various aspects of the invention taken in conjunction with the accompanying drawings in which:

FIGS. 3-6 depict the navigation of a user in the corporate portal of FIG. 2 during a first of three successive days ("Day 1").

Figure 1:
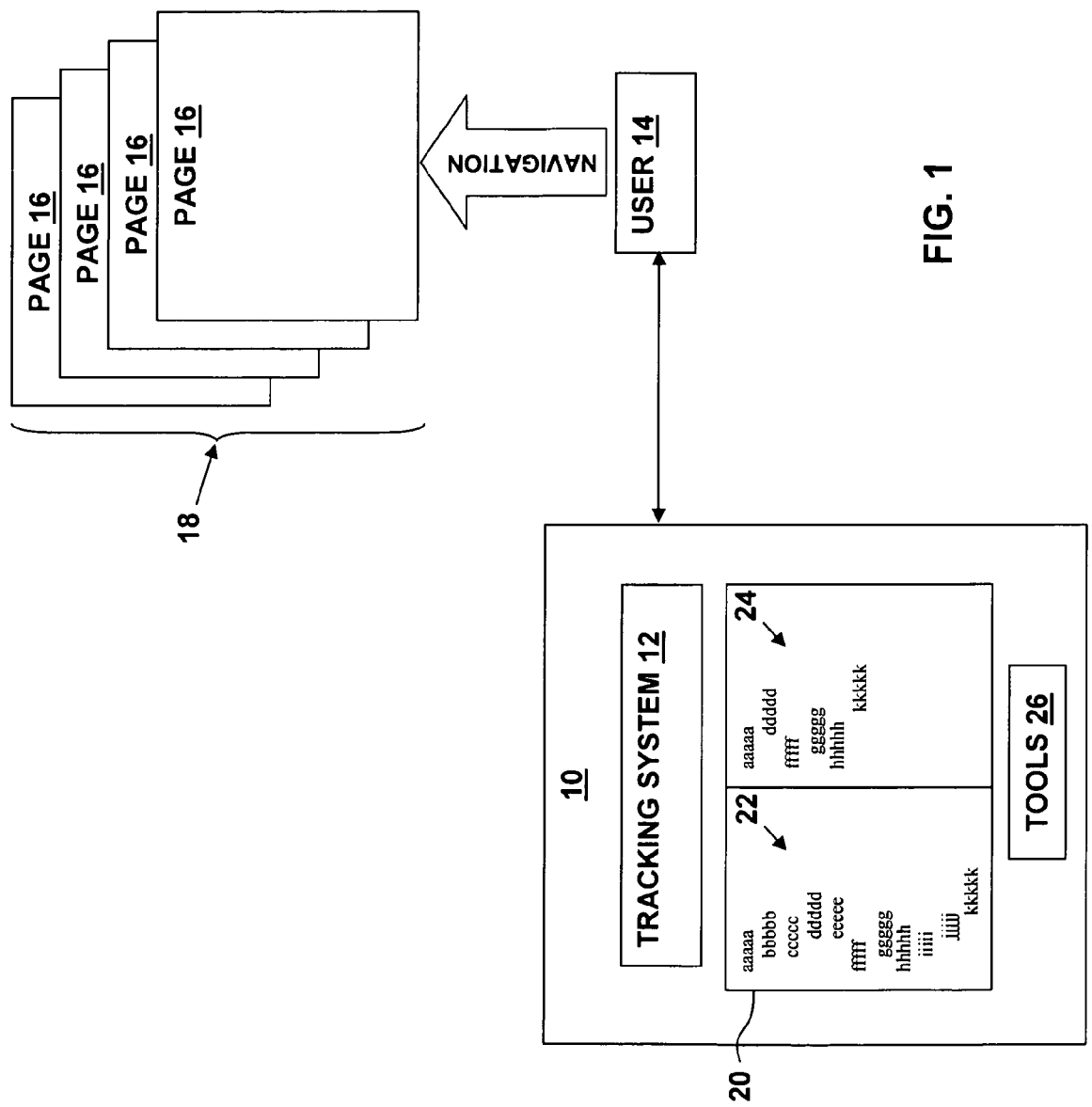
FIG. 1 depicts an illustrative system for creating navigation views based on historical user behavior in accordance with an embodiment of the present invention.

The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION OF THE INVENTION

As indicated above, the present invention provides a method, system, and computer program product for creating navigation views based on historical user behavior.

An illustrative system 10 for creating navigation views based on historical user behavior in accordance with an embodiment of the present invention is depicted in FIG. 1. System 10 includes a tracking system 12 for tracking the navigation of a user 14 through the pages 16 of a portal or website 18. An interface 20 is provided by system 10 in which the complete site map 22 for the portal or website 18 is displayed on a first side, while a "reduced" site map 24, showing only the pages of the portal or website 18 actually navigated by user 14, is displayed on a second side. Tools 26, described in greater detail below, are provided by system 10 to change various parameters for displaying the complete site map 22 and the reduced site map 24. Although described herein in terms of a portal or website, the concepts of the present invention can be extended for use with any structured content including, for example, a file system, shared file system, document library, etc.

Figure 2:
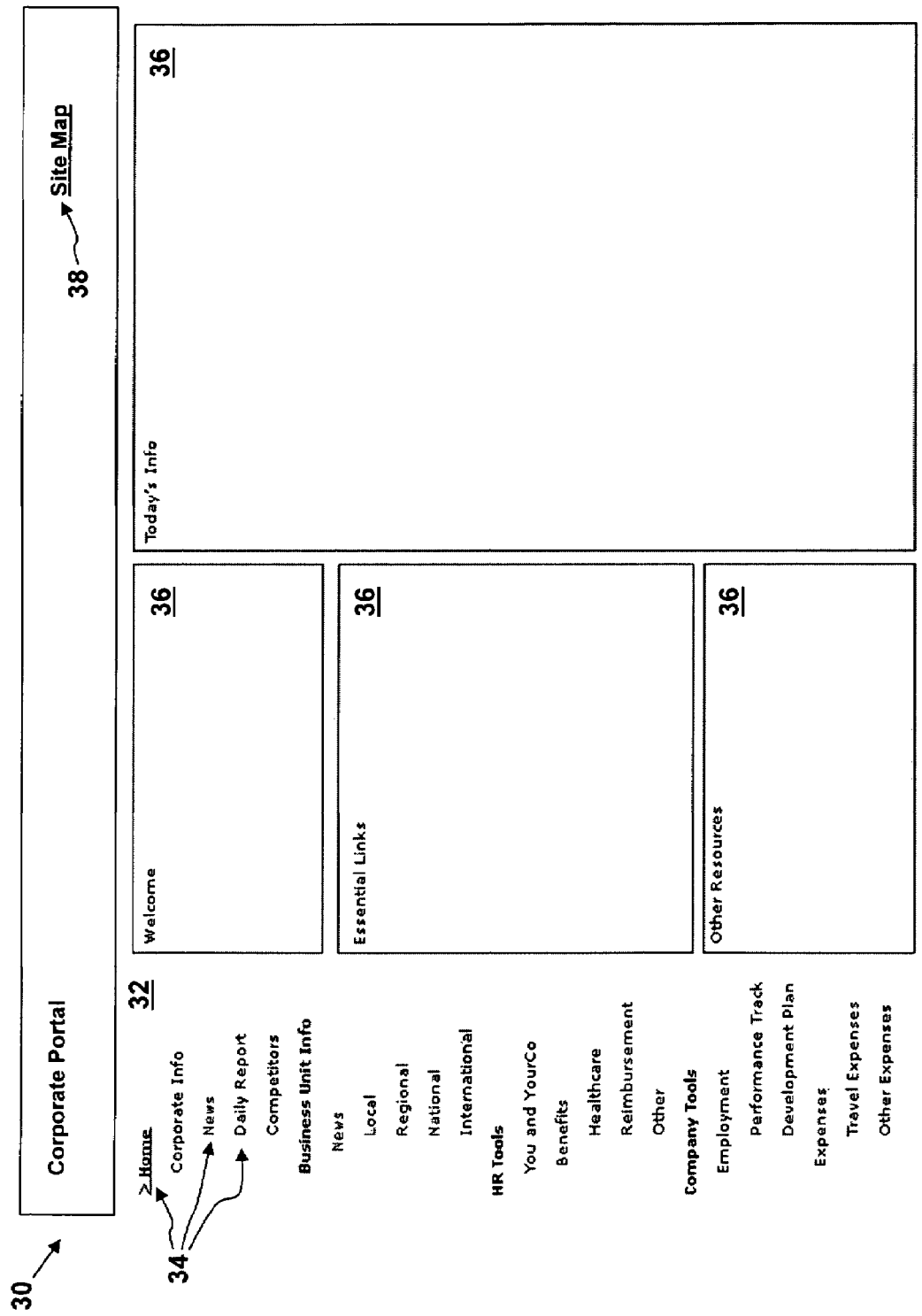
FIG. 2 depicts an illustrative "corporate portal."

An illustrative "corporate portal" 30 is depicted in FIG. 2. As shown, the corporate portal 30 includes a navigation pane 32 containing a plurality of links 34 for navigating to various pages in a corporate website, and at least one portlet 36 or other section providing access to information, links, resources, etc., in a manner known in the art. Also provided is a link 38 to a site map page. In this example, the view of the corporate portal 30 corresponds to the "home page." It should be noted that other methods for navigating portals and websites can also be used in the practice of the present invention—as long as the navigation can be tracked in some manner to provide historical user behavior.

Although embodiments of the present invention will be described below with reference to the illustrative corporate portal 30, it should be clear that the corporate portal 30 is only an example of the numerous types of portals and websites to which the present invention can be applied. Accordingly, the corporate portal 30 is not intended to limit the scope of the present invention in any way. Further, it is assumed that the reader has an understanding of websites, portals, portlets, etc., commensurate with one skilled in the art. As such, a detailed discussion of this technology will not be provided herein.

The following example is used to describe the operation of the present invention. In this example, a user navigates the corporate portal 30 on three successive days. The present invention tracks the navigation of the user, generates reduced site maps based on default and/or user-set parameters, and provides custom portals based on the generated reduced site maps.

Figure 3:
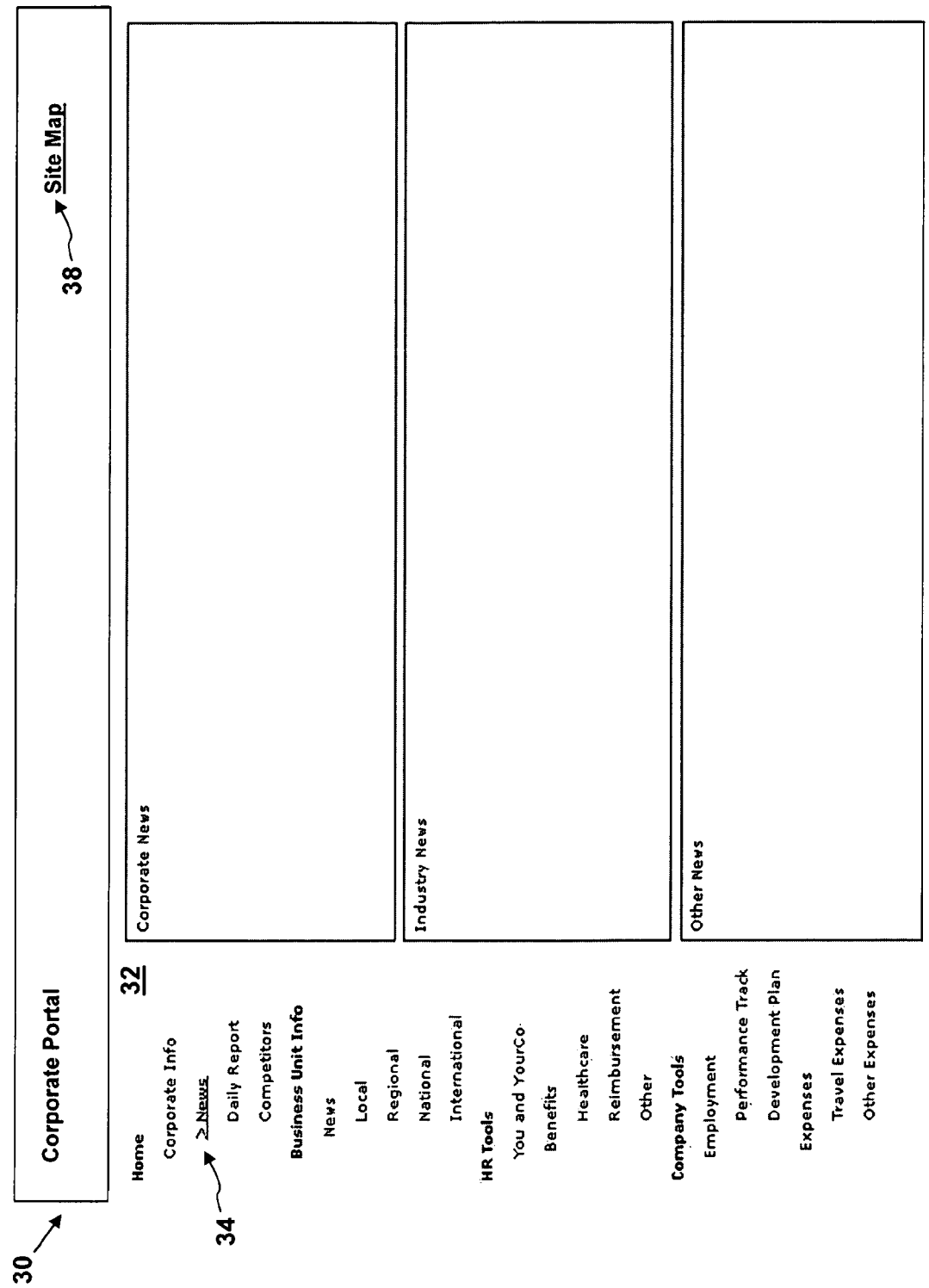
Figure 4:
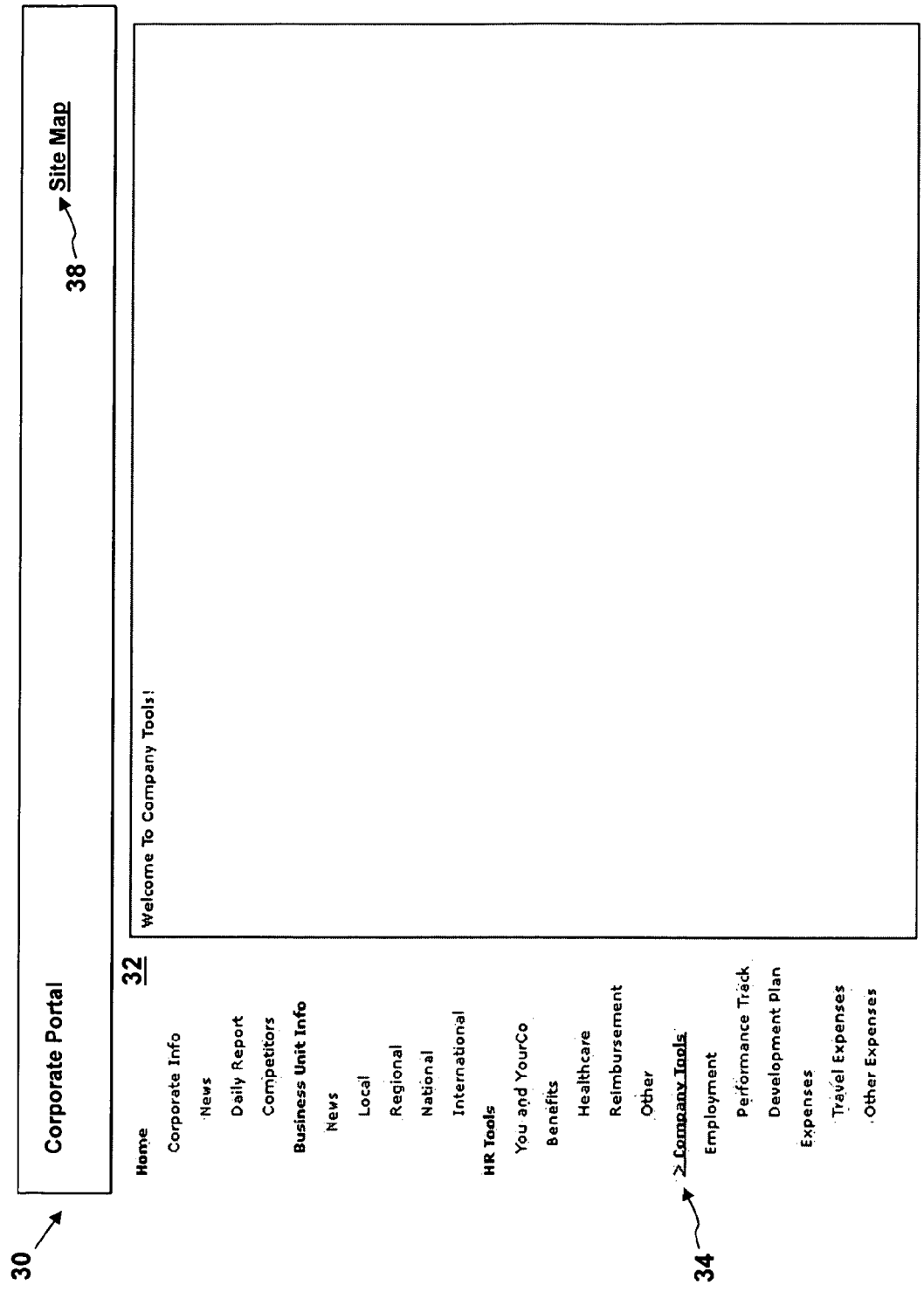
Figure 6:
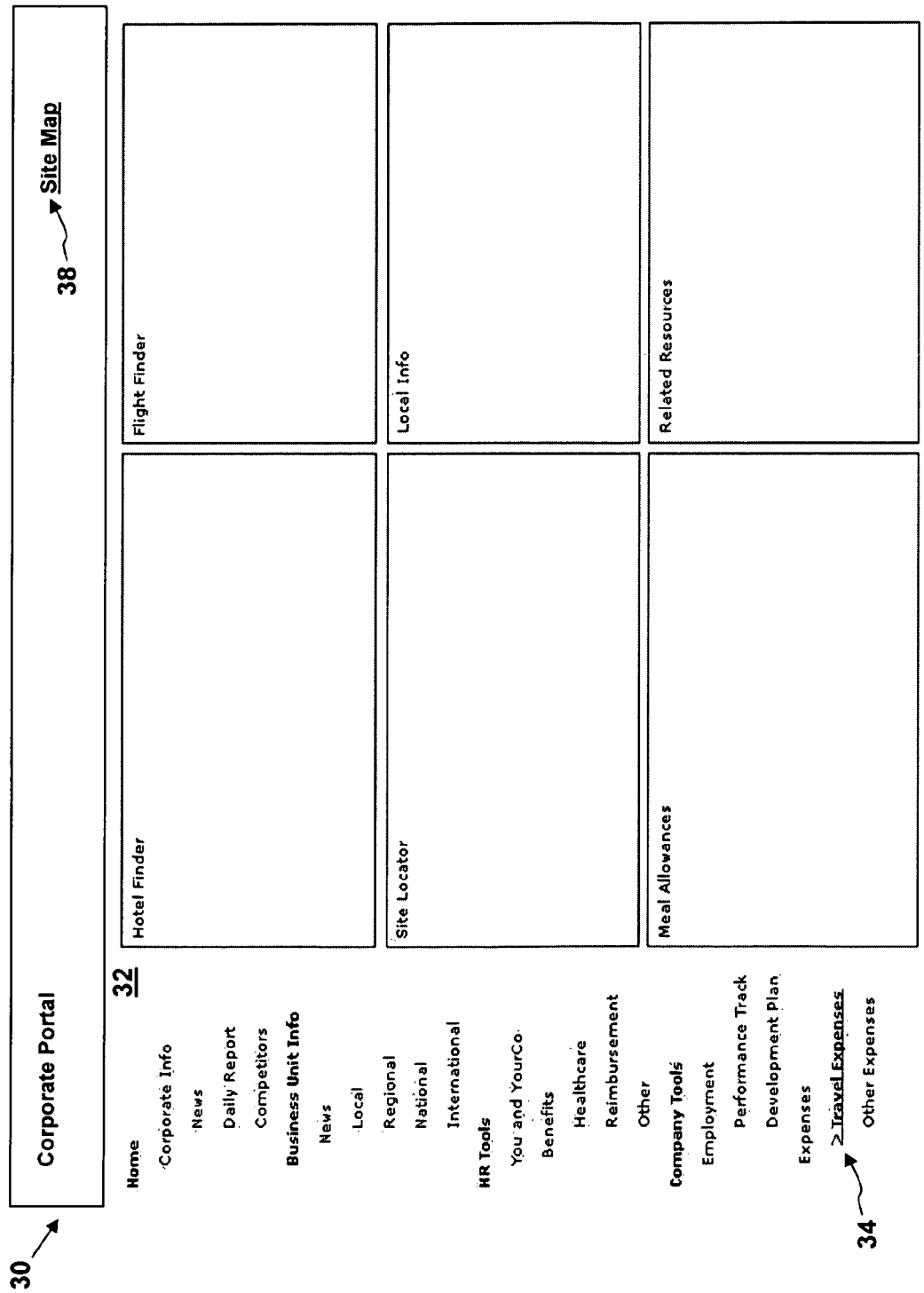

Assume that on a first day (Day 1), a user navigates the pages of the corporate portal 30 using the following links 34:
Home→News→Company Tools→Expenses→Travel Expenses→Home After the user selects (e.g., clicks) the News link 34 in the navigation pane 32, the corporate portal 30 appears as shown in FIG. 3. When the user subsequently selects the Company Tools link 34 in the navigation pane 32, the corporate portal 30 appears as shown in FIG. 4. Upon subsequent selection of the Expenses and Travel Expenses links 34 in the navigation pane 32, the corporate portal 30 appears as shown in FIGS. 5 and 6, respectively. Finally, after selecting the Home link in the navigation pane 32, the user is again provided with the view illustrated in FIG. 2.

Assume that on the following day (Day 2), the user navigates the pages of the corporate portal 30 using the following links 34:
Home→News→Travel Expenses→Home.

Figure 7:
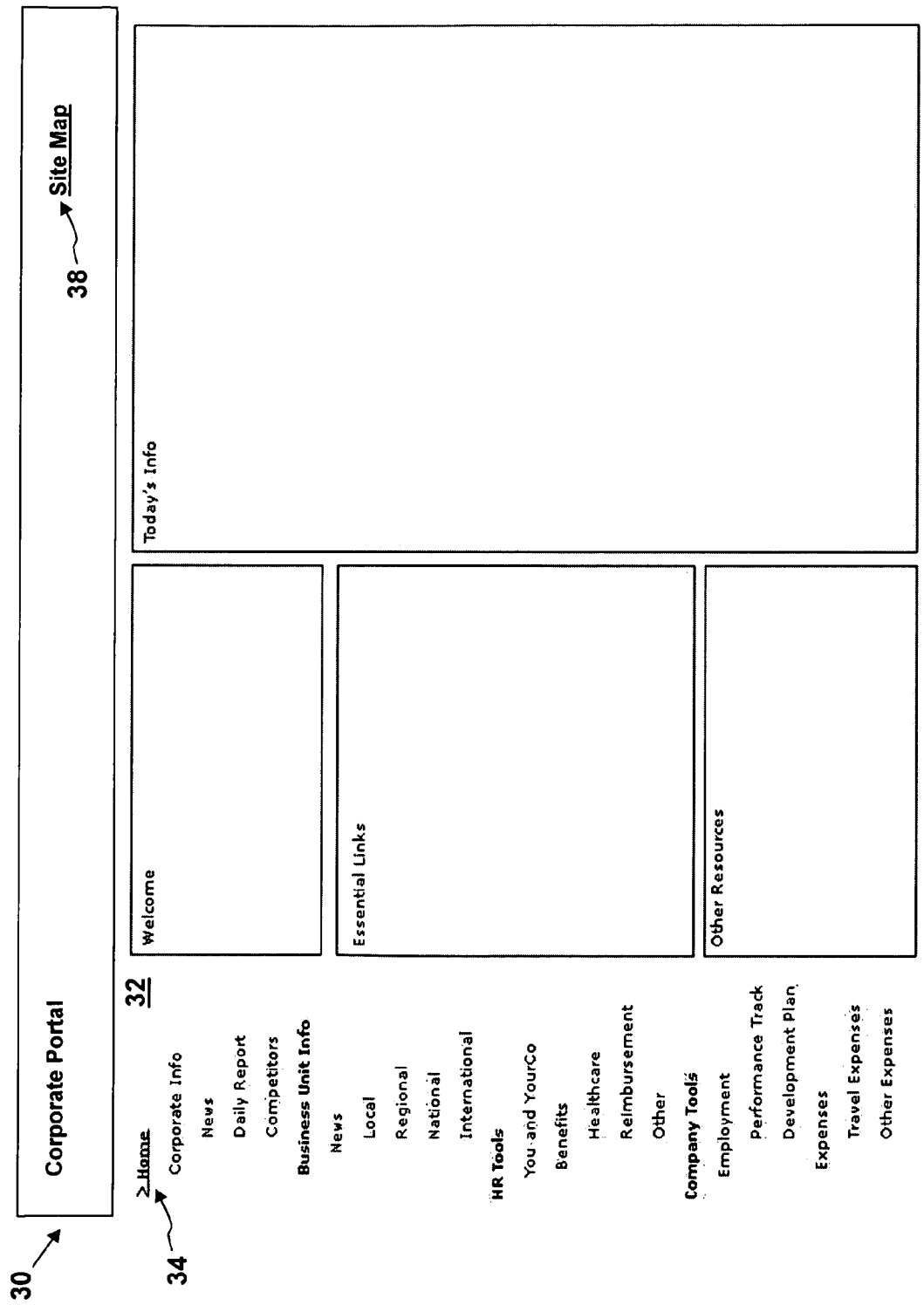
FIGS. 7-9 depict the navigation of the user in the corporate portal of FIG. 2 during a second of three successive days ("Day 2").
Figure 8:
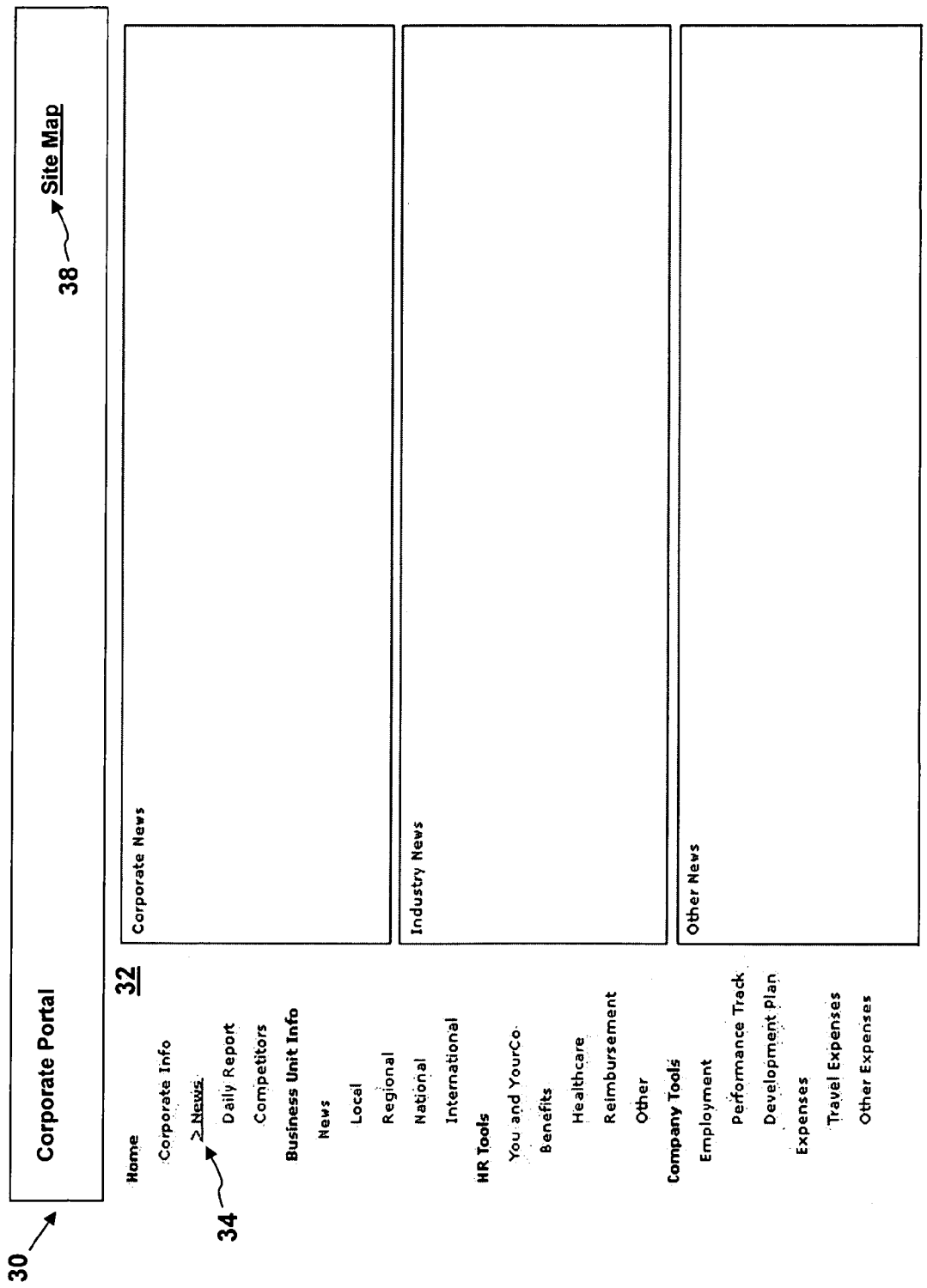
Figure 9:
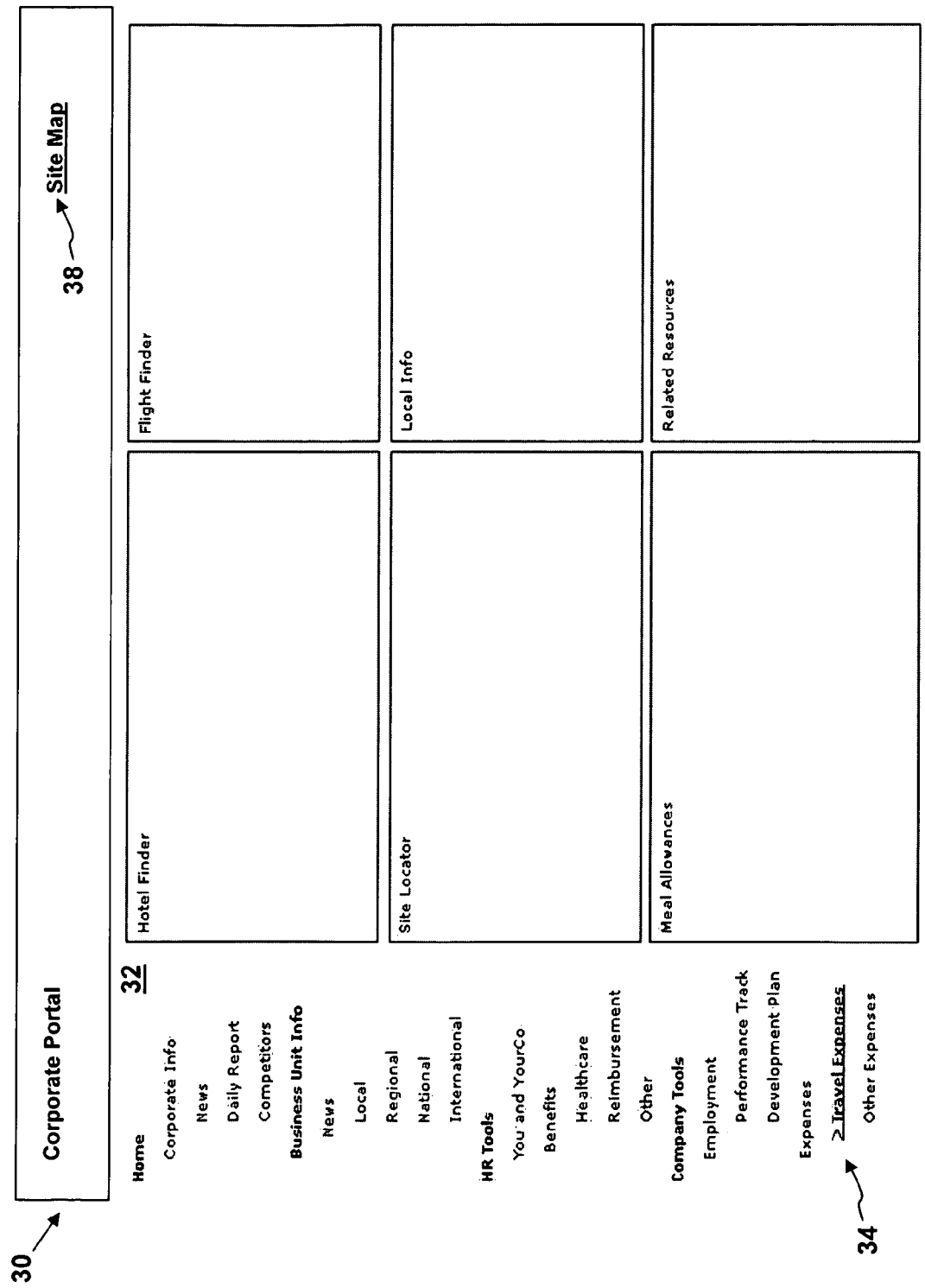

The corporate portal 30 initially appears as shown in FIG. 7, and subsequently appears as shown in FIGS. 8 and 9 in response to the selection of the News and Travel Expenses links 34 in the navigation pane 32, respectively. After selecting the Home link in the navigation pane 32, the user is again provided with the view illustrated in FIG. 7.

Assume that on the next day (Day 3), the user navigates the pages of the corporate portal 30 using the following links 34:
Home→News→Travel Expenses→Healthcare→Home.

Figure 10:
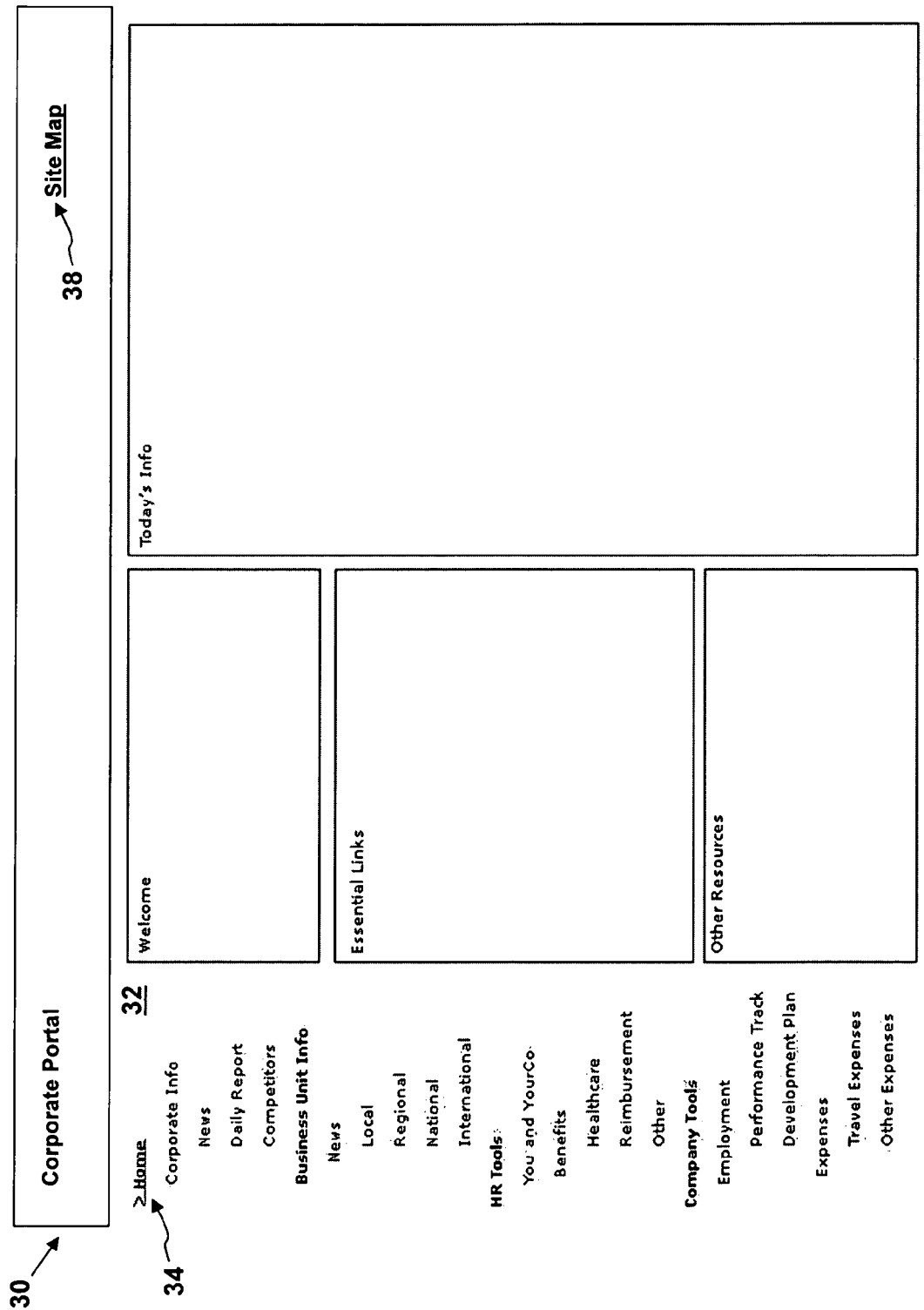
FIGS. 10-13 depict the navigation of the user in the corporate portal of FIG. 2 during a third of three successive days ("Day 3").
Figure 11:
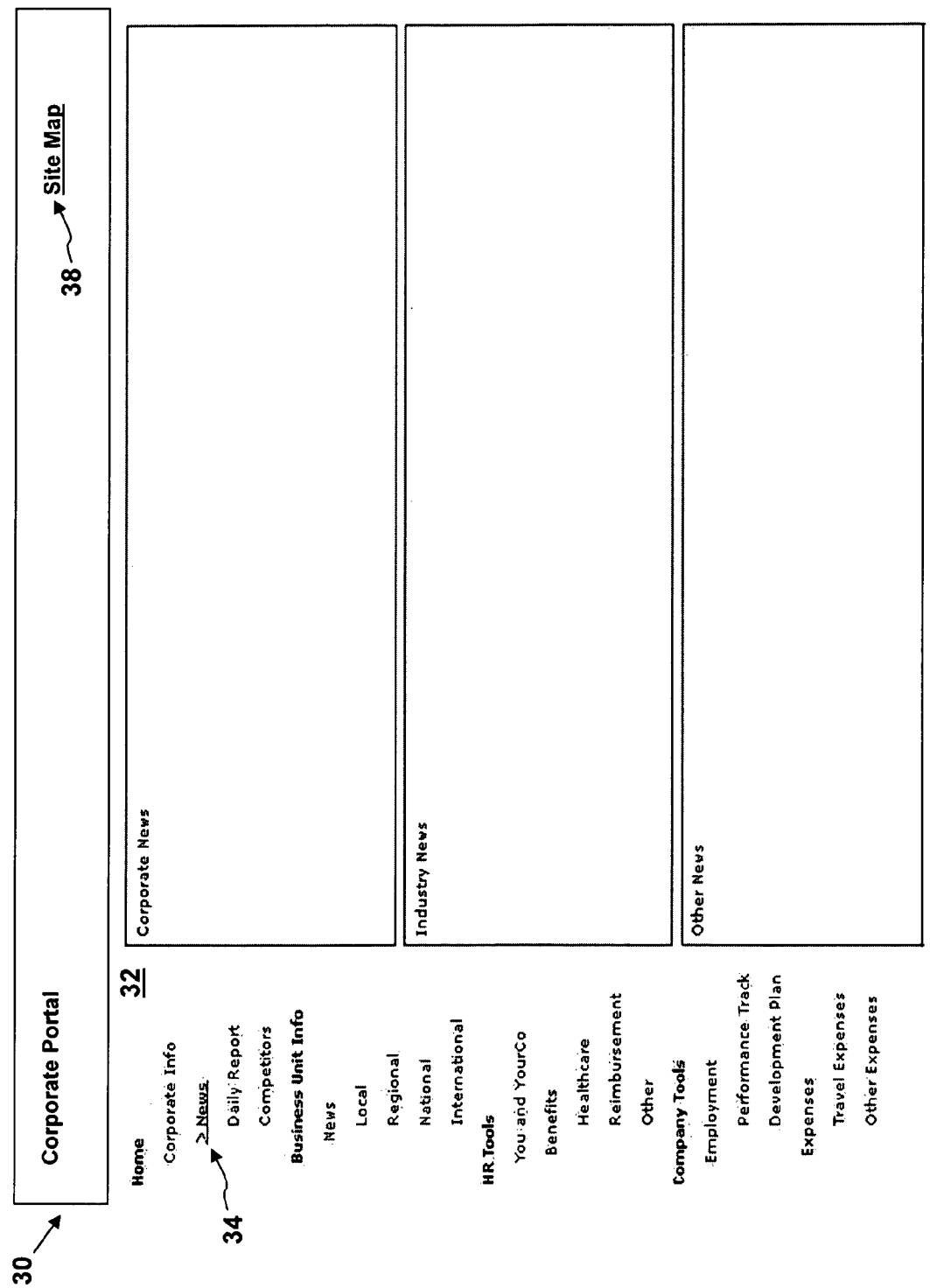
Figure 12:
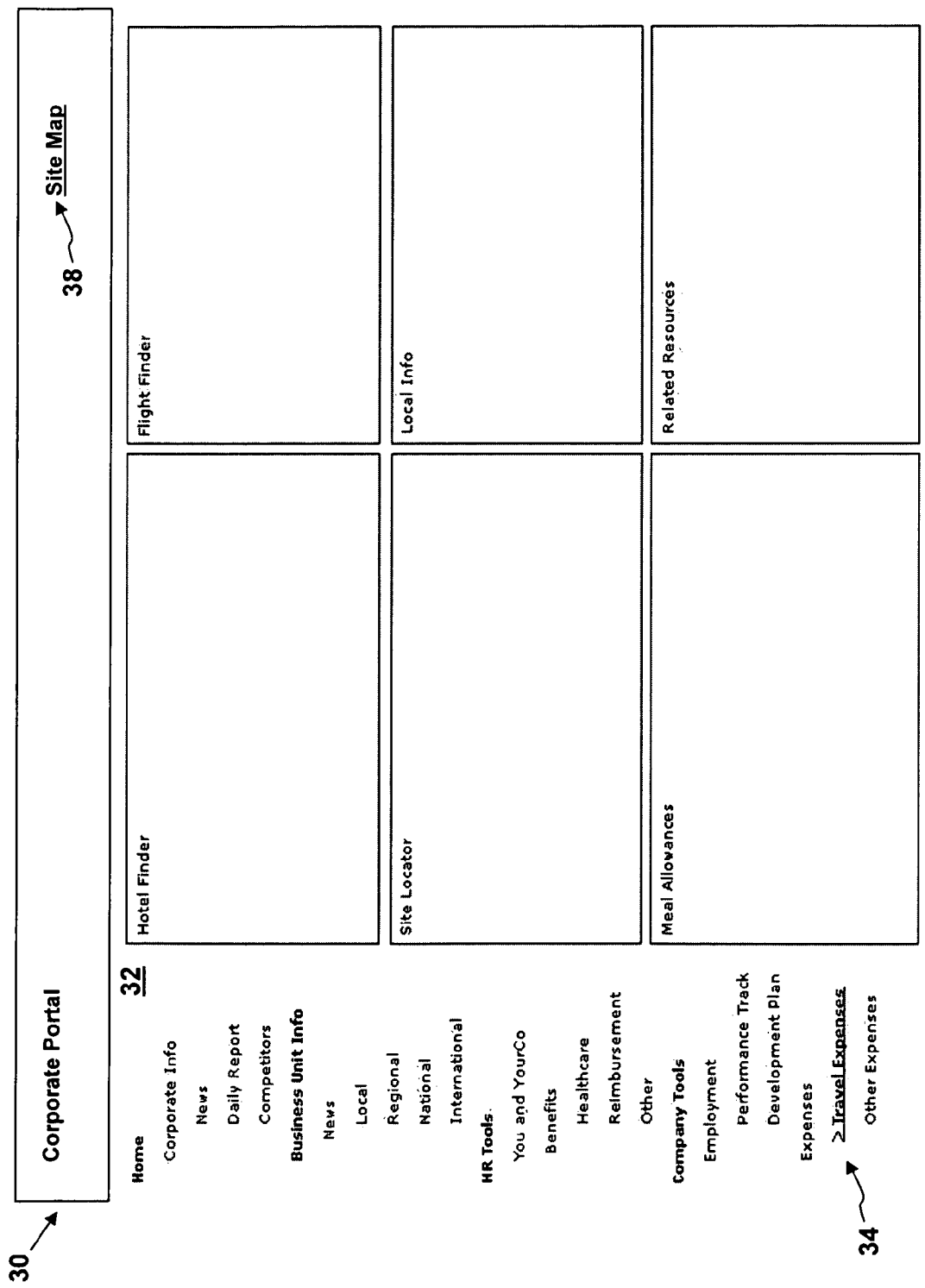
Figure 13:
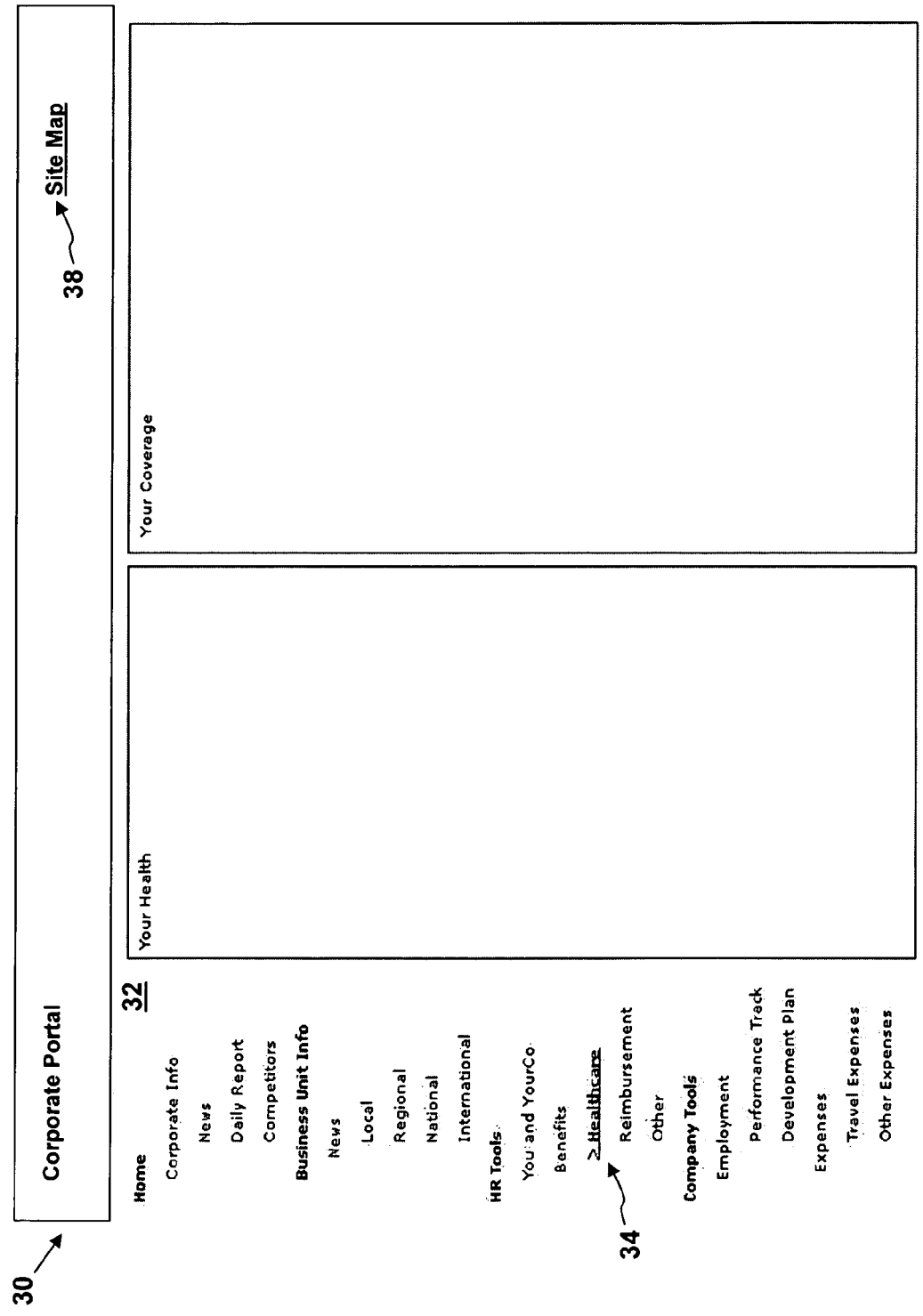

The corporate portal 30 initially appears as shown in FIG. 10, and subsequently appears as shown in FIGS. 11, 12, and 13 in response to the selection of the News, Travel Expenses, and Healthcare links 34 in the navigation pane 32, respectively. After selecting the Home link in the navigation pane 32, the user is again provided with the view illustrated in FIG. 10.

Figure 14:
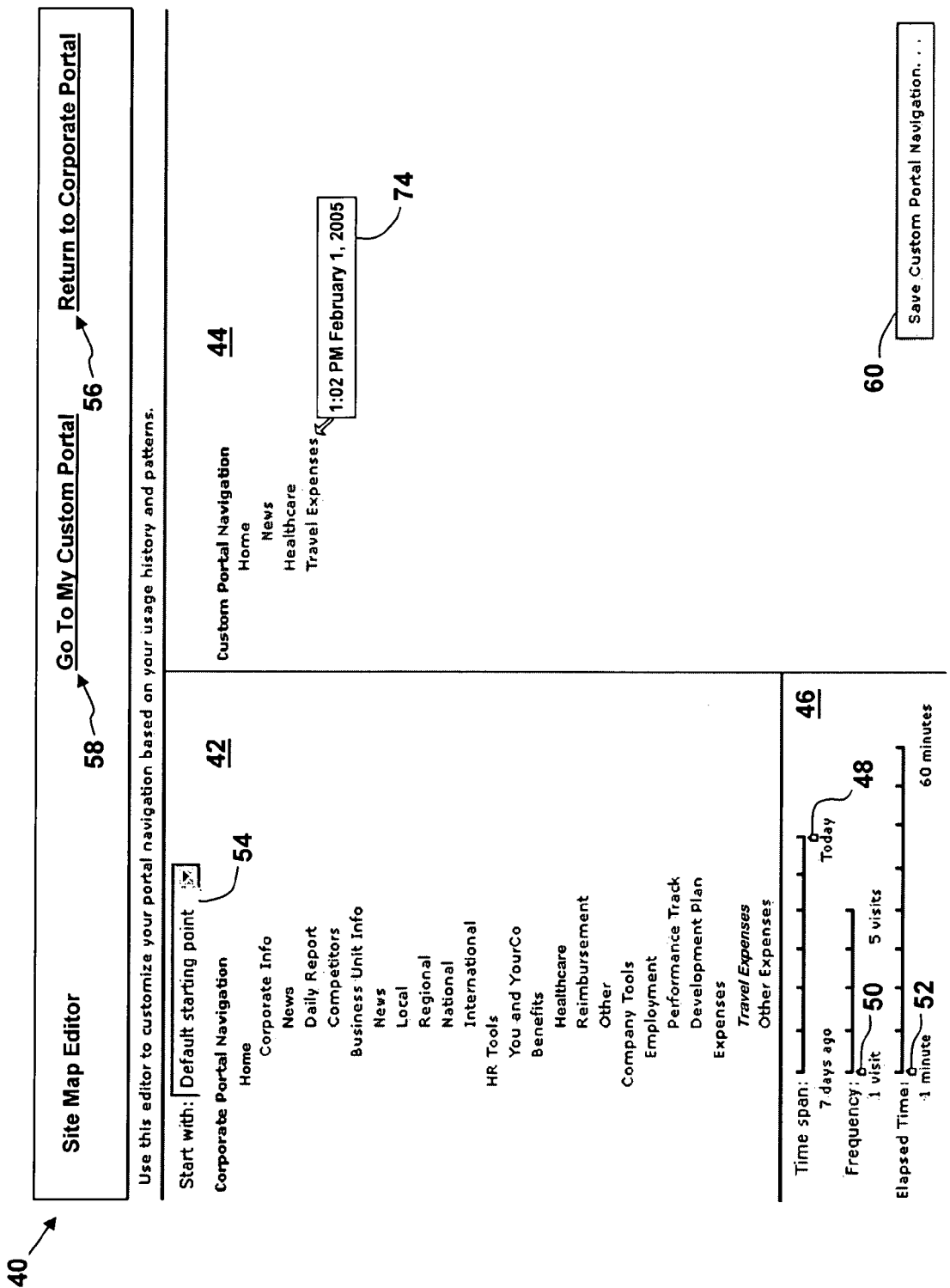
FIGS. 14-17 depict a reduced site map and complete site map produced by a site map editor in accordance with an embodiment of the present invention.

After completing the above-described navigation, the user selects the site map link 38 in the banner of the corporate portal 30. In response, the user is provided with a dual-pane site map editor 40 as shown in FIG. 14. The site map editor 40 is used to customize a user's navigation based on usage history and patterns.

As illustrated in FIG. 14, the complete site map 42 for the corporate portal 30 is displayed on a first side of the site map editor 40, while a reduced site map 44, showing only navigated pages of the corporate portal 30 (or a selected set thereof), is displayed on a second side of the site map editor 40. A link 56 is provided for returning to the corporate portal 30. Another link 58 is provided for navigating to a custom portal in accordance with the present invention.

The navigated pages of the corporate portal 30 displayed in the reduced site map 44 can be selectively filtered using a set of tools 46. The set of tools 46 are used to define at least one filtering parameter for the display of the navigated pages. Filtering parameters such as time span, frequency, and elapsed time can be used. Other filters are also possible, depending on the needs of the user and/or other factors. For example, filtering parameters such as secure/non-secure, public/private, etc., could also be used in the practice of the present invention. In the embodiment of the site map editor 40 shown in FIG. 14, for example, sliders 48, 50, and 52 are used to set the filtering parameters. Other techniques for setting the filtering parameters, such as menus, direct entry, etc., can also be used.

In the site map editor 40 displayed in FIG. 14, the initial settings for the filtering parameters comprise a time span of "Today," a frequency of "1 visit," and an elapsed time of at least "1 minute." Referring to the above example, the pages visited "today" (i.e., on Day 3), comprise: Home→News→Travel Expenses→Healthcare→Home. Thus, the navigated pages displayed by the reduced site map 44 of the site map editor 40 are as follows:

Home
        News
        Healthcare
        Travel Expenses

As shown, the navigated pages displayed by the reduced site map 44 of the site map editor 40 are displayed in the same order as they appear in the complete site map 44, using the same hierarchical organization. Many other techniques for displaying the navigated pages in the reduced site map 44 can also be used, including, for example, "longest time on a path," "order visited," etc.

The navigated pages displayed by the reduced site map 44 are also highlighted in some manner in the complete site map 42 of the site map editor 40. In FIG. 14, for example, the navigated pages displayed by the reduced site map 44 are bolded and displayed in a different color than the remaining pages represented in the complete site map 42. Other suitable techniques for highlighting these pages are also possible. Such techniques may comprise, for example, the use of a different font, a different font size, etc. The use of italicization for the Travel Expenses navigated page will be explained in a later section.

Figure 15:
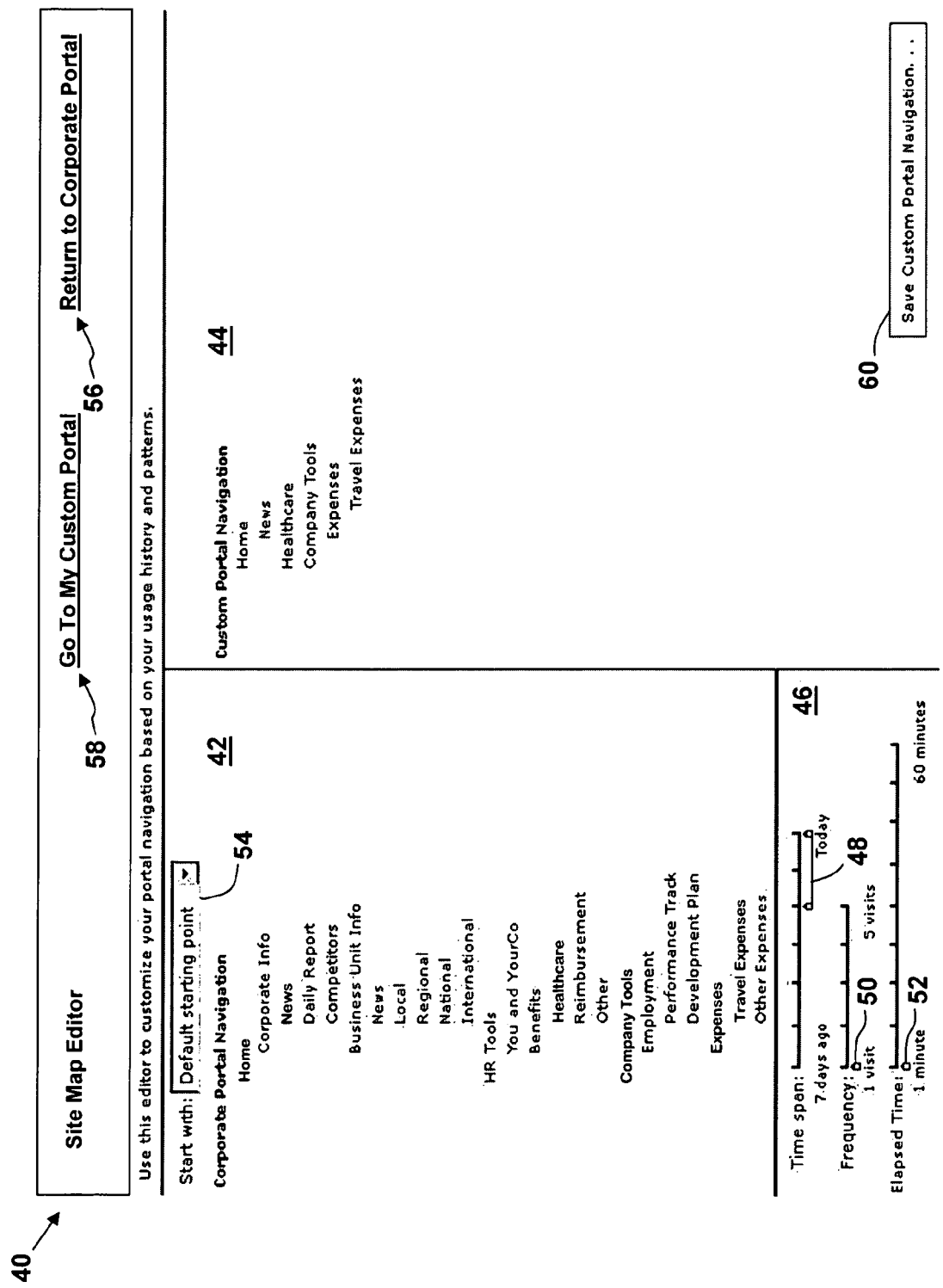

When the range specified by the time span slider 48 in the set of tools 46 is subsequently changed from "Today" to "2 days ago," the reduced site map 44 and the complete site map 42 of the site map editor 40 automatically change to the views illustrated in FIG. 15. As shown, the reduced site map 44 now also includes the pages that were navigated two days ago (i.e., Day 2) in addition to the pages that were navigated today (i.e., Day 3). That is, the reduced site map 44 displays the union of the set of navigated pages for Day 3 and Day 2. To this extent, the navigated pages displayed by the reduced site map 44 of the site map editor 40 are as follows:

Home
        News
    Healthcare
    Company Tools
        Expenses
            Travel Expenses As before, the navigated pages displayed by the reduced site map 44 are also highlighted in the complete site map 42 of the site map editor 40. The current time span being displayed can easily be determined by examining the state of the time span slider 48.

The reduced site map 44 can be further filtered by adjusting the frequency slider 50 in the set of tools 46. In the above example, for instance, the total frequency of visits to each navigated page during the two day period of Day 2 and Day 3 are as follows:

Home: 4
    News: 2
    Healthcare: 1
    Travel Expenses: 2

When the frequency of visits specified by the frequency slider 50 in the set of tools 46 is subsequently changed from "1 visit" to "2 visits," the reduced site map 44 and the complete site map 42 of the site map editor 40 automatically change to the views illustrated in FIG. 16. As shown, only those navigated pages that have been visited a total of least two times during the two day period of Day 2 and Day 3 (i.e., Home, News, and Travel Expenses) are displayed in the reduced site map 44. As before, the navigated pages displayed by the reduced site map 44 are also highlighted in the complete site map 42 of the site map editor 40.

Figure 16:
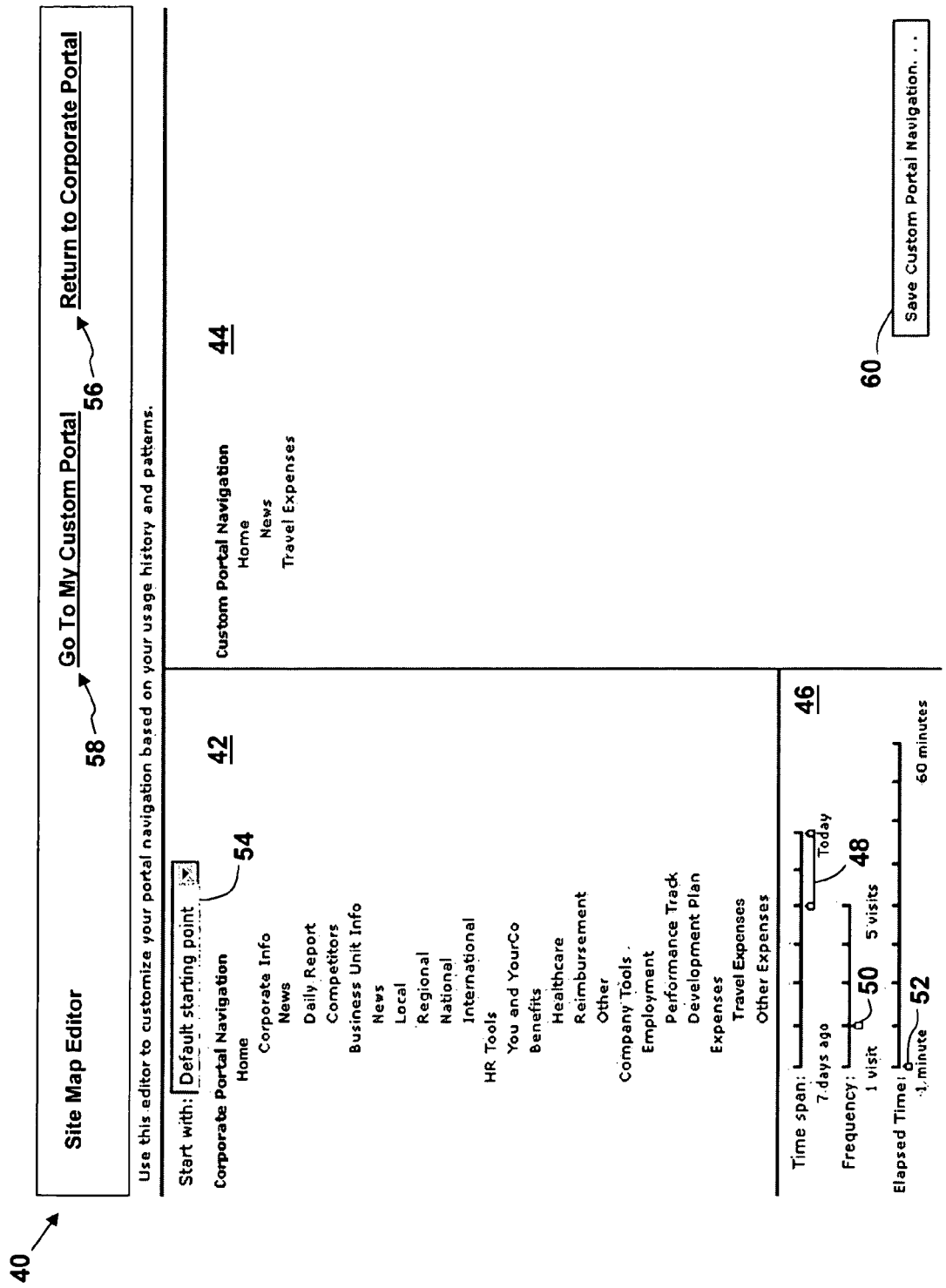

In the above example, it is assumed that the total time spent by the user at each of the navigated pages displayed in the reduced site map 44 of FIG. 16 is as follows:

Home: 10 minutes
    News: 28 minutes
    Travel Expenses: 23 minutes

Figure 17:
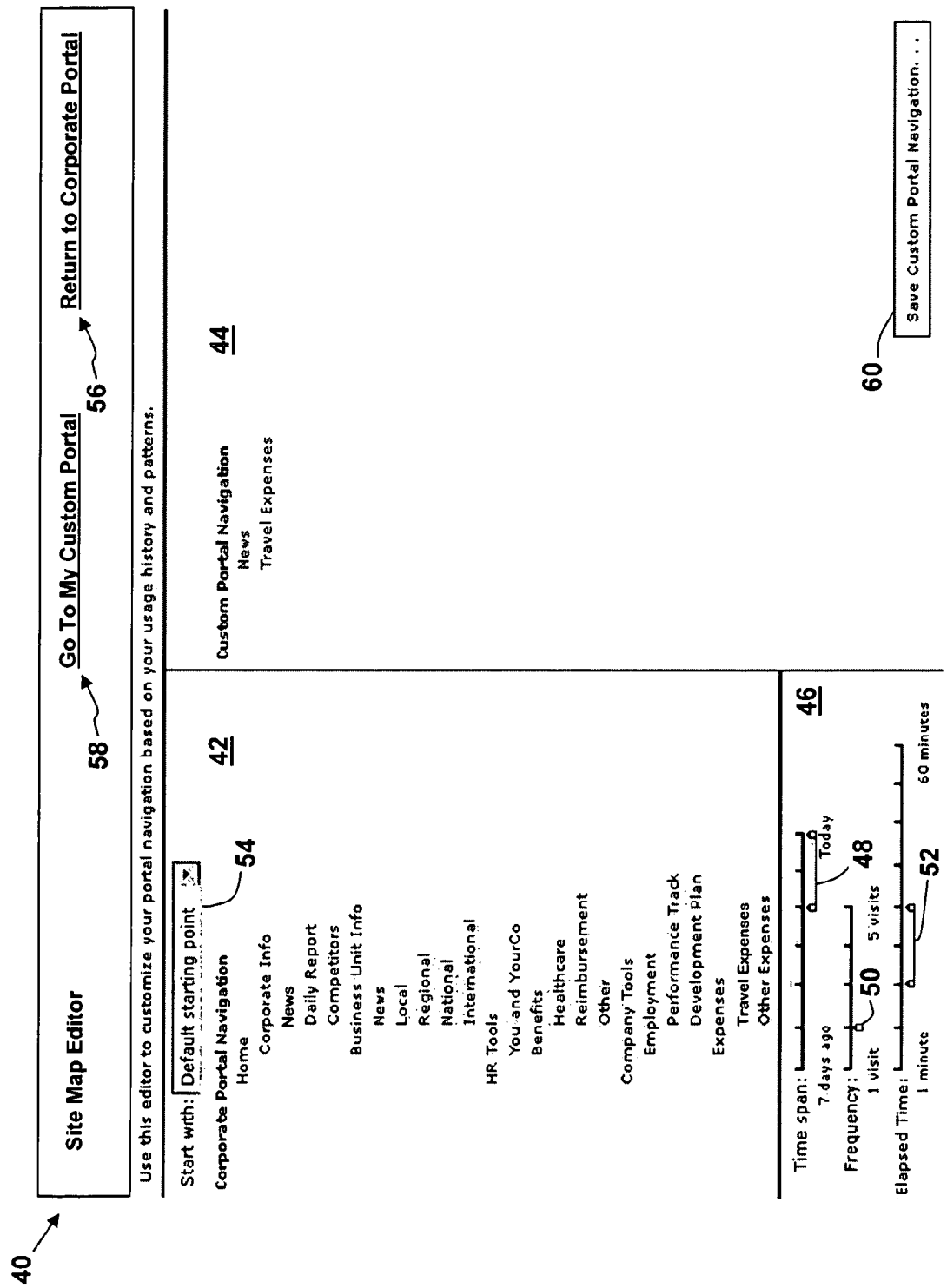

When the total elapsed time spent on each navigated page specified by the elapsed time slider 52 in the set of tools 46 is subsequently changed from "1 minute" to the range of "15 minutes" to "30 minutes," the reduced site map 44 and the complete site map 42 of the site map editor 40 automatically change to the views illustrated in FIG. 17. As shown, only those navigated pages that have been visited a total of least two times, for a total time of between 15 and 30 minutes, during the two day period of Day 2 and Day 3 (i.e., News, and Travel Expenses) are displayed in the reduced site map 44. As before, the navigated pages displayed by the reduced site map 44 are also highlighted in the complete site map 42 of the site map editor 40.

Figure 18:
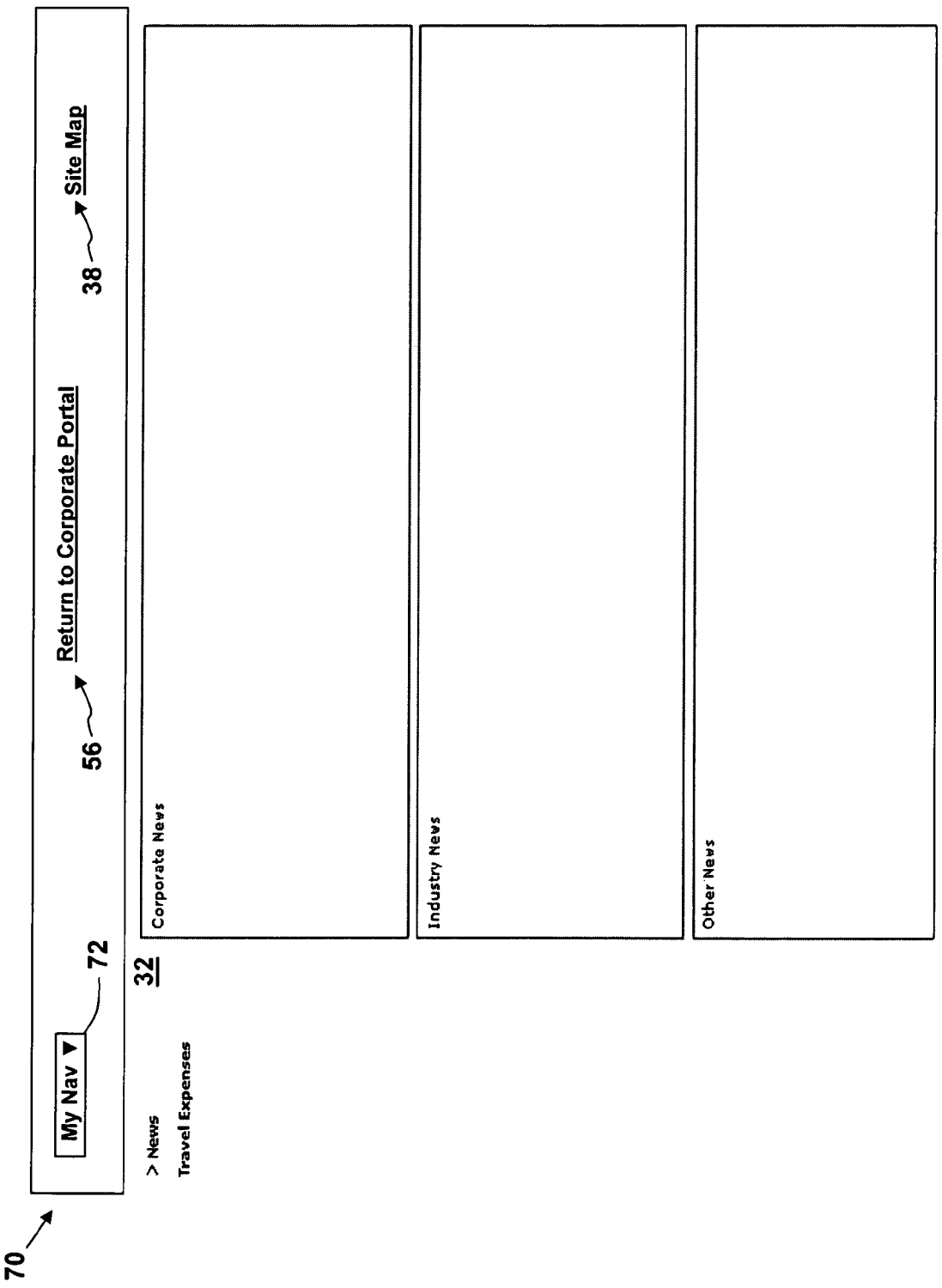
FIG. 18 depicts a custom portal produced in accordance with an embodiment of the present invention.

The custom portal navigation represented by a reduced site map 44 produced using the site map editor 40 of the present invention can be saved and used to generate a custom portal for the user. For example, the custom portal navigation represented by the reduced site map 44 displayed in FIG. 17 can be saved and given a name (e.g., "My Nav") by the user by selecting the "Save Custom Portal Navigation" button 60. Thereafter, the user can select the "Go to My Custom Portal" link 58 and then select a saved custom portal navigation, which causes a corresponding custom portal to be displayed. For example, a custom portal 70 corresponding to the custom portal navigation "My Nav" is illustrated in FIG. 18. As shown, only the pages corresponding to the custom portal navigation represented by the reduced site map 44 of FIG. 17 (i.e., "My Nav") are displayed in the navigation pane 32 of the custom portal 70. Other saved custom portal navigations can be accessed using a drop-down menu widget 72 as shown in FIG. 18, or using any other suitable selection methodology. A user can return to the corporate portal 30 by selecting the "Return to Corporate Portal" link 56. A user can also return to the site map editor 40 (e.g., to further edit/update the reduced site map) by selecting the "site map" link 38.

By default, the entire site map of the corporate portal 30 is displayed by the complete site map 42 of the site map editor 40. However, a widget 54 or the like can be provided to allow a user to change the initial view provided by the complete site map 42. This would allow a user to begin with another, previously created site map on the complete site map 42 side of the site map editor 40, rather than the entire site map. In this case, if the user had visited a page that was not part of the starting navigation displayed on the complete site map 42 side of the site map editor 40, it would not appear in the reduced site map 44. This would allow successive filtering, somewhat like performing a second search on the result set of an initial search.

In accordance with another embodiment of the present invention, each navigated page shown in a reduced site map 44 can be selectively "turned off." This allow for the editing of the reduced site map 44. Such editing may be desired, for example, if a user does not want to include one or more pages that met the filtering parameters defined by the set of tools 36. An example of this is shown in FIGS. 19A-D.

Figure 19A:
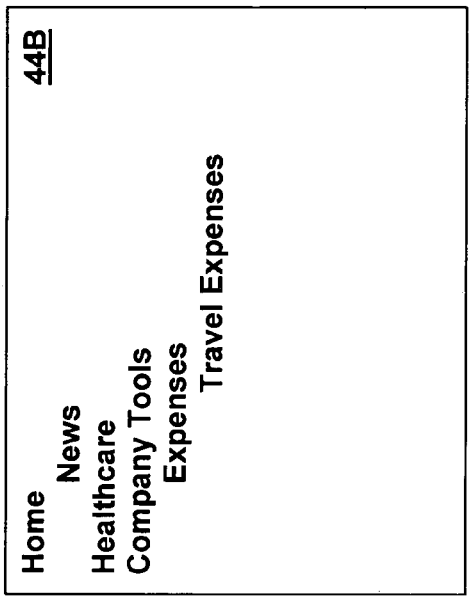
FIGS. 19A-D depict a reduced site map with selectively deleted navigated pages, produced in accordance with an embodiment of the present invention.
Figure 19B:
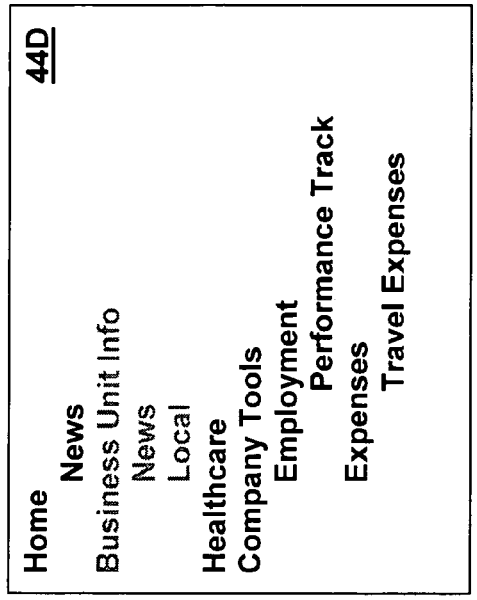
Figure 19C:
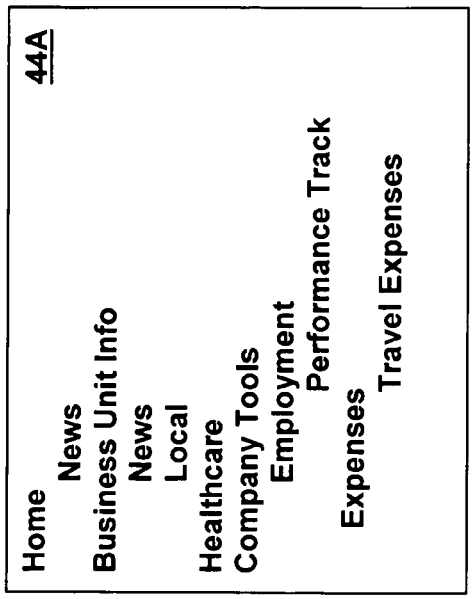
Figure 19D:
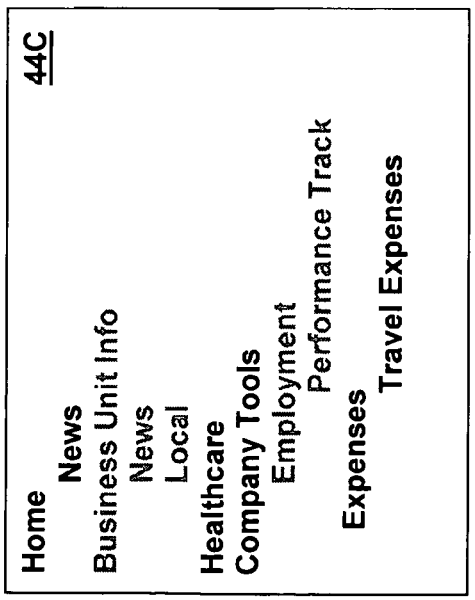

In FIG. 19A, there is shown a reduced site map 44A generated according to the present invention. Upon examining the reduced site map 44A, a user decides that he/she does not want to include the pages associated with "Business Unit Info" and "Employment" in a custom portal 70 he/she is attempting to generate. To this extent, the user selects the "Business Unit Info" and "Employment" pages in the reduced site map 44A, which causes those pages and any descendents thereof to be deleted. The resultant reduced site map 44B is shown in FIG. 19B. The selected pages can be permanently deleted as shown, or can be temporarily deleted such that a subsequent selection of a deleted page will return that page and any descendents thereof to the reduced site map 44. In FIG. 19C, for example, the pages deleted from a reduced site map 44C are shown as "grayed out." Any other suitable technique for differentiating the deleted pages can also be used. The deleted pages will not be included in a custom portal 70 generated based on the reduced site map 44C. If the user again selects the "Employment" page in the reduced site map 44C, the reduced site map 44D shown in FIG. 19D is produced.

In addition to the selective deletion of pages from a reduced site map 44, other standard tasks such as renaming, reordering entries and level, etc., could be provided in the reduced navigation map 44. Further, in addition to turning off nodes in the reduced site map 44, a user could also selectively add nodes from the complete site map 42 into the reduced site map 44 for inclusion in a saved navigation. Such editing of the reduced site map 44 could be performed, for example in step S5 of FIG. 20 (described below).

In accordance with another embodiment of the present invention, those pages in the complete site map 42 of the site map editor 40 that have been recently modified (e.g., portlet added to page, portlet reconfigured, etc.) can include a mechanism for indicating that a recent change has occurred. Such a mechanism may comprise, for example, the use of a different color font or font attribute (italics, underline), etc. "Recent" can be defined as any appropriate time period, such as 6 hours, 1 day, 1 week, 1 month, etc. An example of this is illustrated in FIG. 14, where the "Travel Expenses" page in the complete site map 42 has been italicized, indicating that a recent change in that page has occurred.

In accordance with yet another embodiment of the present invention, the time and/or date of the last visit to a page displayed in a reduced site map 44 can be provided to the user. The time and/or date can be displayed, for example, next to each navigated page, via a hover display, or using any other suitable technique. An example of the use of a hover display 74 to provide the time and date of the last visit to the "Travel Expenses" page in a reduced site map 44 is depicted in FIG. 14.

The present invention allows users to tailor portals or websites according to their usage in general, or for particular tasks. For instance, during a given week a user may have undergone preparation for an audit. In doing so, the user may have navigated to many areas of their corporate site to find all the critical documentation, guidance, and tracking sources needed for the audit. Using the concepts of the present invention, the user can set the time period (e.g., one week), frequency (e.g., 2 visits), and elapsed time (e.g., at least 1 minute), remove any stray/unneeded pages they may have visited, and save the resultant reduced site map to provide a custom portal named "Audit." When the real audit occurs, the user can select the "Audit" custom portal from their list of saved custom portals, thereby displaying only content related to the audit.

An administrator or the like can use the present invention to view navigation information/patterns for a given portal or website for one or a combination of users. The administrator can visually analyze the navigated pages of the portal or website, according to frequency of visits and/or other filtering parameters, and can create public custom portals for users, or choose to re-organize the portal or website based upon this analysis. The present invention can be further extended to allow for the sharing of custom portals among users or groups of users.

Figure 20:
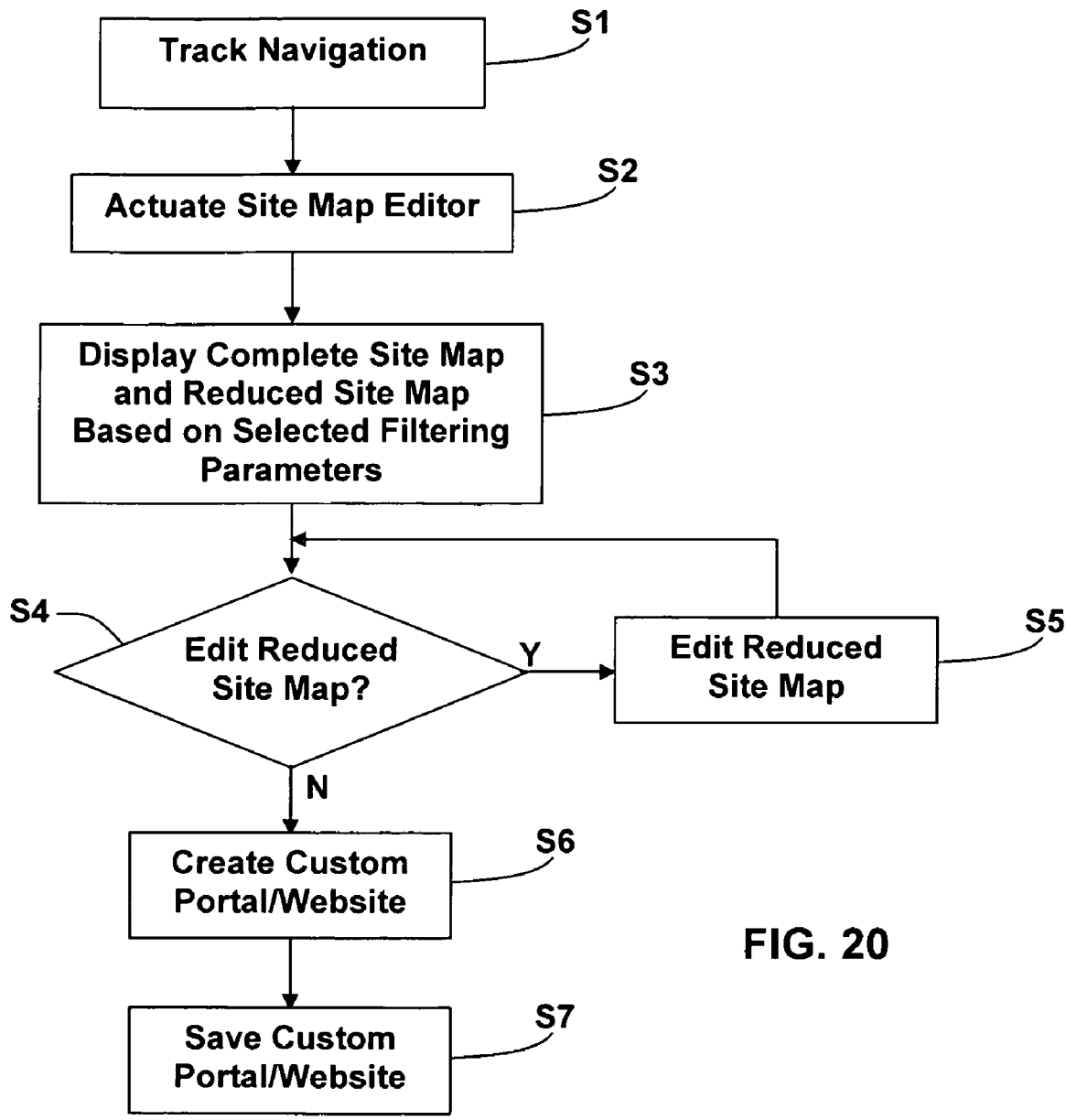
FIG. 20 depicts a flow diagram of a method in accordance with an embodiment of the present invention.

FIG. 20 depicts a flow diagram of a method in accordance with an embodiment of the present invention. In step S1, the navigation of at least one user through a portal or website is tracked for a predetermined period of time (e.g., several days, a week, a month, etc.). In step S2, a site map editor is actuated. In step S3, the site map editor produces and displays a complete site map and reduced set map based on user tracking data for the at least one user and at least one filtering parameter. In steps S4-S5, the reduced site map is edited as necessary by adjusting the at least one filtering parameter and/or deleting selected navigated pages. In step S6, a custom portal or website based on the reduced site map is created. In step S7, the custom portal or website is saved for reuse.

Figure 21:
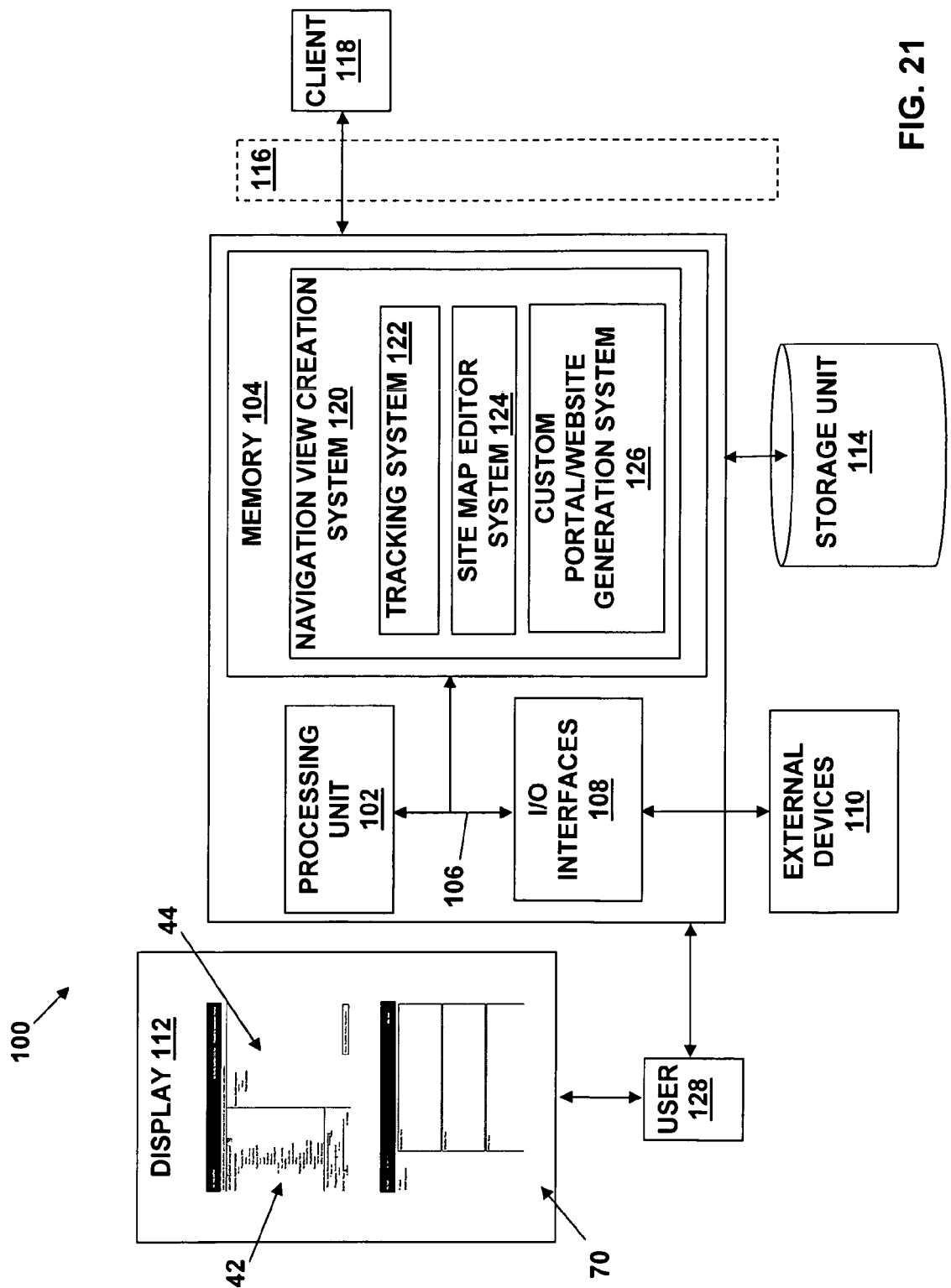
FIG. 21 depicts a computer system for implementing a method in accordance with an embodiment of the present invention.

A computer system 100 for creating navigation views based on historical user behavior in accordance with an embodiment of the present invention is illustrated in FIG. 21. As shown, computer system 100 generally includes a processing unit 102, memory 104, bus 106, input/output (I/O) interfaces 108, external devices/resources 110, and storage unit 112. Processing unit 102 may comprise a single processing unit, or may be distributed across one or more processing units in one or more locations. Memory 104 may comprise any known type of data storage and/or transmission media, including magnetic media, optical media, random access memory (RAM), read-only memory (ROM), etc. Moreover, similar to processing unit 102, memory 104 may reside at a single physical location, comprising one or more types of data storage, or be distributed across a plurality of physical systems in various forms.

I/O interfaces 108 may comprise any system for exchanging information to/from an external source. External devices/resources 110 may comprise any known type of external device, including speakers, a CRT, LED screen, handheld device, keyboard, mouse, voice recognition system, speech output system, printer, monitor/display (e.g., display 112), facsimile, pager, etc.

Bus 106 provides a communication link between each of the components in computer system 100, and likewise may comprise any known type of transmission link, including electrical, optical, wireless, etc. In addition, although not shown, additional components, such as cache memory, communication systems, system software, etc., may be incorporated into computer system 100.

Data (e.g., tracking data, complete/reduced site maps, custom portals/websites, etc.) used in the practice of the present invention can be stored locally to computer system 100, for example, in storage unit 114, and/or may be provided to computer system 100 over a network 116. Storage unit 114 can be any system capable of providing storage for data and information under the present invention. As such, storage unit 114 may reside at a single physical location, comprising one or more types of data storage, or may be distributed across a plurality of physical systems in various forms. In another embodiment, storage unit 114 may be distributed across, for example, a local area network (LAN), wide area network (WAN) or a storage area network (SAN) (not shown).

Network 116 is intended to represent any type of network over which data can be transmitted. For example, network 116 can include the Internet, a wide area network (WAN), a local area network (LAN), a virtual private network (VPN), a WiFi network, or other type of network. To this extent, communication can occur via a direct hardwired connection or via an addressable connection in a client-server (or server-server) environment that may utilize any combination of wireline and/or wireless transmission methods. In the case of the latter, the server and client may utilize conventional network connectivity, such as Token Ring, Ethernet, WiFi or other conventional communications standards. Where the client communicates with the server via the Internet, connectivity could be provided by conventional TCP/IP sockets-based protocol. In this instance, the client would utilize an Internet service provider to establish connectivity to the server. One or more client devices 118 may be connected to computer system 100 via network 116. Each client device 118 comprises components similar to those described above with regard to computer system 100.

Shown in memory 104 as a computer program product is a navigation view creation system 120 for creating navigation views based on historical user behavior in accordance with an embodiment of the present invention. Navigation view creation system 120 includes a tracking system 122 for tracking the navigation of at least one user through a portal or website for a predetermined period of time, and a site map editor system 124 for producing and displaying (e.g., on display 112) a complete site map 42 and reduced site map 44 based on user tracking data for the at least one user and at least one filtering parameter, and for editing the reduced site map 44. Also provided is a custom portal/website generation system 126 for providing and displaying (e.g., on display 112) a custom portal/website 70 to a user 128 based on a reduced site map.

It should be appreciated that the teachings of the present invention can be offered as a business method on a subscription or fee basis. For example, computer system 100 could be created, maintained, supported, and/or deployed by a service provider that offers the functions described herein for customers. That is, a service provider could be used to create navigation views based on historical user behavior, as describe above.

It should also be understood that the present invention can be realized in hardware, software, a propagated signal, or any combination thereof. Any kind of computer/server system(s)—or other apparatus adapted for carrying out the methods described herein—is suited. A typical combination of hardware and software could be a general purpose computer system with a computer program that, when loaded and executed, carries out the respective methods described herein. Alternatively, a specific use computer, containing specialized hardware for carrying out one or more of the functional tasks of the invention, could be utilized. The present invention can also be embedded in a computer program product or a propagated signal, which comprises all the respective features enabling the implementation of the methods described herein, and which—when loaded in a computer system—is able to carry out these methods. Computer program, propagated signal, software program, program, or software, in the present context mean any expression, in any language, code or notation, of a set of instructions intended to cause a system having an information processing capability to perform a particular function either directly or after either or both of the following: (a) conversion to another language, code or notation; and/or (b) reproduction in a different material form.

The foregoing description of the preferred embodiments of this invention has been presented for purposes of illustration and description. It is not intended to be exhaustive or to limit the invention to the precise form disclosed, and obviously, many modifications and variations are possible. Such modifications and variations that may be apparent to a person skilled in the art are intended to be included within the scope of this invention as defined by the accompanying claims.

We claim:

1. A method for creating navigation views, comprising:
    tracking pages navigated by a user through a site to provide tracking data;
    generating a complete site view displaying a map of all pages in the site;
    generating a reduced site view based on the tracking data and at least one filtering parameter, wherein the reduced site view displays a set of the pages navigated by the user, filtered by the at least one filtering parameter;
    creating a custom navigation view based on the reduced site view, and
    outputting the custom navigation view concurrently with the complete site view.

2. The method of claim 1, wherein the site comprises a portal or website, and wherein the custom navigation view comprises a custom portal or a custom website, respectively.

3. The method of claim 1, wherein the site comprises structured content.

4. The method of claim 1, further comprising:
    displaying the complete site view and the reduced site view side-by-side.

5. The method of claim 1, further comprising:
    editing the reduced site view.

6. The method of claim 5, wherein editing the reduced site view further comprises:
    selectively adjusting the at least one filtering parameter.

7. The method of claim 6, wherein the at least one filtering parameter is selected from the group consisting of a time span, frequency, and elapsed time.

8. The method of claim 5, wherein editing the reduced site view further comprises:
selectively adjusting a number of pages in the reduced site view.

9. The method of claim 8, further comprising:
deleting at least one page from the reduced site view.

10. The method of claim 8, further comprising:
adding a page from the complete site view into the reduced site view.

11. The method of claim 1, wherein the at least one filtering parameter is adjustable.

12. The method of claim 1, wherein pages in the reduced site view are highlighted in the complete site view.

13. The method of claim 1, further comprising:
saving and reusing the custom navigation view.

14. The method of claim 13, further comprising:
displaying a saved custom navigation view in the complete site view instead of all pages of the site.

15. The method of claim 1, further comprising:
highlighting pages in the complete site view that have been recently modified.

16. The method of claim 1, further comprising:
displaying a time and date of a most recent visit to a page in the reduced site view.

17. A method for creating navigation views, comprising:
tracking pages navigated by a user through a site to provide tracking data;
generating a complete site view displaying a map of all pages in the site;
generating a reduced site view adjacent the complete site view based on the tracking data and at least one filtering parameter, wherein the reduced site view displays a set of the pages navigated by the user, filtered by the at least one filtering parameter view, and
outputting the complete site view concurrently with the reduced site view.

* * * * *